United States Patent [19]

Pullukat et al.

[11] 3,941,761
[45] Mar. 2, 1976

[54] METHOD OF POLYMERIZING OLEFINS

[75] Inventors: Thomas J. Pullukat, Hoffman Estates; Mitsuzo Shida; Robert L. Gillilan, both of Barrington, all of Ill.

[73] Assignee: Chemplex Company, Rolling Meadows, Ill. ; a part interest

[22] Filed: Dec. 23, 1974

[21] Appl. No.: 535,190

Related U.S. Application Data

[62] Division of Ser. No. 439,248, Feb. 4, 1974, Pat. No. 3,884,832.

[52] U.S. Cl. .......... 260/94.9 D; 260/93.7; 260/94.3; 260/94.9 E
[51] Int. Cl.² ..................... C08F 4/02; C08F 10/02
[58] Field of Search ...... 260/93.7, 94.9 D, 94.9 DA, 260/88.2

[56] References Cited
UNITED STATES PATENTS

| | | | |
|---|---|---|---|
| 2,981,725 | 4/1961 | Luft et al. | 260/94.9 DA |
| 3,031,514 | 4/1962 | Kosmin | 260/94.9 DA |
| 3,168,484 | 2/1965 | Engel et al. | 260/94.9 DA |
| 3,646,000 | 2/1972 | Horvath | 260/94.9 D |
| 3,780,011 | 12/1973 | Pullukat et al | 260/94.9 D |
| 3,876,554 | 4/1975 | Pullukat | 260/94.9 DA |

*Primary Examiner*—Edward J. Smith
*Attorney, Agent, or Firm*—Wegner, Stellman, McCord, Wiles & Wood

[57] ABSTRACT

Methods of making polymers from polymerizable 1-olefins which comprise polymerizing at least one 1-olefin with a catalyst system consisting essentially of a mixture of (1) a support which is a finely divided insoluble inorganic support material such as silica, alumina, zirconia or thoria or mixtures thereof containing titanium, zirconium or nickel prepared by fluidizing the finely divided support in the form of a bed with a substantially dry gas while adding to the bed at an elevated temperature, while fluidizing, a compound of the class consisting of titanium or zirconium or nickel esters, or halides or mixtures thereof which were further calcined at a higher temperature and (2) an organotin chromate containing the group essentially of the formula

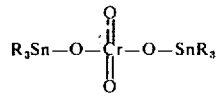

and (3) cocatalytic amounts of an alkyl aluminum compound of the formula $R_aAlX_b$ in each of which formula R is a hydrocarbon radical containing from 1 to about 14 carbon atoms, X is hydrogen, halogen or alkoxy, $a$ is an integer of 1 to 3, $b$ is an integer of 0 to 2 and the sum of $a$ and $b$ is 3, the system having an aluminum-chromium ratio of at least 2 to 1.

12 Claims, No Drawings

METHOD OF POLYMERIZING OLEFINS

CROSS-REFERENCE TO RELATED APPLICATION

This application is a division of our copending application Ser. No. 439,248, filed Feb. 4, 1974 now U.S. Pat. No. 3,884,832 issued May 20, 1975.

BACKGROUND OF THE INVENTION

It is well known that olefins can be polymerized with complex catalyst compositions consisting of two or more independent components. For example, in the so-called Ziegler process a transition metal compound like $TiCl_3$ is treated with an activating agent like aluminum alkyl and the resultant composition is used in ethylene polymerization. Recently in U.S. Pat. Nos. 3,488,333, 3,647,722 and 3,642,746 are described modifications whereby the transition metal compound is supported on a carrier like magnesium carbonate, magnesium chloride, etc. thus enabling higher reactivity. These catalysts are insoluble in hydrocarbon solvents and the chloride residue left in the polymer is harmful.

Another well known process is the Phillips process in which chromium oxide supported on silica is used after oxygen (air) activation. In U.S. Pat. Nos. 3,130,188 and 3,165,504 are described $(NH_4)_2SiF_6$ and $ZrF_4$ modifications of the basic $CrO_3$-silica catalyst system to increase the activity. One of the disadvantages of this system is the extreme susceptibility of the catalyst to damage by traces of oxygen, carbon monoxide, water, etc. Extreme care should be observed in the polymerization of this system. The $CrO_3$-silica catalyst system has another disadvantage of having an induction time which tends to cause operational problems in the manufacture of polyolefins such as polyethylene by this process.

In U.S. Pat. No. 3,622,521 there is described a modification of the chromium trioxide-silica catalyst by including tetraisopropyl titanate. The patentees found that a catalyst containing, for example, 5% titanium gives a higher melt index material.

In Pullukat et al U.S. Pat. No. 3,780,011 assigned to the same assignee as the present application there is described a catalyst containing titanium, for example 3.5% titanium, on chromium trioxide-silica to give higher activity, higher melt index, and higher HLMI/MI for the polymer and also no induction time in etylene polymerization.

Recently a different type of olefin polymerization catalyst has been described. In U.S. Pat. Nos. 3,324,101, 3,324,095 and 3,468,865 are described catalyst systems consisting of an organosilyl chromate and an aluminum alkyl deposited on silica.

In U.S. Pat. No. 3,493,554 is described a bis(diorgano) chromate-aluminum alkyl system. These catalysts even though they do not contain chlorides have the disadvantage of being relatively unstable. In fact, some silyl chromates are known to explode violently.

DESCRIPTION OF THE PREFERRED EMBODIMENTS

In Application Ser. No. 414,177 entitled "A Catalyst System, a New Chromate and Method of Polymerizing Olefins" filed Nov. 8, 1973 by T. J. Pullukat, one of the inventors here, now U.S. Pat. No. 3,876,554, issued Apr. 18, 1975, and herein incorporated by reference, there is described and claimed a new process and a new catalyst system for olefin polymerization based on a new and different class of catalytic compounds, hereinafter called tinchromates characterized by the formula:

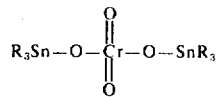

wherein R is a hydrocarbon group of from 1 to about 14 carbon atoms, in combination with alkyl aluminum compounds. These catalysts can be used in solution in an inert hydrocarbon or they may be supported on an inert high surface area solid support such as silica, alumina, zirconia, thoria or mixtures thereof.

It has now been discovered by the applicants here that the chemical nature of the support has an unexpectedly advantageous effect on the polymerizing activity of the final catalyst: that is, if the support, and especially silica, is modified by incorporating a titanium or zirconium or nickel ester or halide or mixtures thereof into it and then the resulting modified silica used with the above combination of organotin chromate and alkyl aluminum compound the activity of the resulting catalyst is markedly increased over the same catalyst but without the above modification of the support. The modifying esters are alkyl esters containing 1 to about 7 carbon atoms in the alkyl group and the esters as well as the halides are substantially free of non-aqueous solvents.

The adding of the esters and halides to the support is preferably accomplished while fluidizing the finely divided support at an elevated temperature with a substantially dry gas that is substantially inert to the support bed and to the ester or halide. It can also be accomplished by using a substantially non-aqueous solvent solution addition of the ester or halide. The ester or halide or mixtures thereof are added in an amount to give about 0.5–10 weight percent of the titanium, zirconium or nickel in the final catalyst. The volatile constituents of the treated support are then driven off as by calcining at a temperature of 300°–1000°C. while fluidizing.

The treated support is next contacted with the alkylaluminum compound and then with the tinchromate. This treatment can be done in the presence of a substantially non-aqueous diluent at ambient temperature or an elevated temperature, for example 100°C. The chemical reaction is faster at the elevated temperature and therefore is preferred. An alternate method is to contact the titanium or zirconium or nickel treated support with the reaction product of the tinchromate and aluminum alkyl compound. Again, this can be done in the presence of the diluent and preferably at an elevated temperature. Still another method is to deposit the tinchromate onto silica which has been treated with the titanium or zirconium or nickel compound and then with an alkyl aluminum compound. The catalyst prepared by the above methods can be used directly in olefin polymerization.

The tinchromates employed herein are characterized by having the formula:

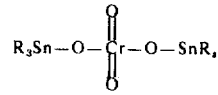

wherein each R is a hydrocarbon group having from 1 to about 14 carbon atoms, preferably from about 3 to about 10 carbon atoms. Illustrative thereof are methyl, ethyl, propyl, isopropyl, n-butyl, iso-butyl, n-pentyl, iso-pentyl, t-pentyl, hexyl, 2-methyl-pentyl, heptyl, octyl, 2-ethylhexyl, nonyl, decyl, hendecyl, dodecyl, tridecyl, tetradecyl, benzyl, phenethyl, p-methyl-benzyl, phenyl, tolyl, xylyl, naphthyl, ethylphenyl, methylnaphthyl, dimethylnaphthyl and the like. Illustrative of the preferred tinchromates (but by no means exhaustive or complete of those which can be employed in this process) are the compounds:

Bis-trimethyltinchromate
Bis-triethyltinchromate
Bis-tributyltinchromate
Bis-triisopentyltinchromate
Bis-tri-2-ethylhexyltinchromate
Bis-tridecyltinchromate
Bis-tri(tetradecyl)tinchromate
Bis-tribenzyltinchromate
Bis-triphenethyltinchromate
Bis-triphenyltinchromate
Bis-tritolyltinchromate
Bis-trixylyltinchromate
Bis-trinaphthyltinchromate
Bis-triethylphenyltinchromate
Bis-trimethylnaphthyltinchromate
Polydiphenyltinchromate
Polydiethyltinchromate,
and the like While both the aryl- and alkylsubstituted tinchromates can be used, it is to be noted that the aryl-tinchromates are more active and are easier to prepare.

It is highly advantageous that the support be finely divided, considering the desirability or possibility of later separation by filtration or other catalyst removal steps, if desired. Preferably, porous supports having large surface areas for the adsorption and/or deposition of the tinchromates such as in the order of 50 to 1000 square meters or more per gram are employed. This provides for greater ease of contact of the olefin monomer with the catalyst. Particle size of porous supports is not critical in this invention but can provide economic and materials handling benefits, depending upon the recovery techniques employed.

In this embodiment of the invention it is highly desirable that the inert support be completely dried and freed of moisture and extraneous liquids before being contacted with the titanium or zirconium or nickel esters or halides. This is normally provided by a simple heating or pre-drying of the catalyst with an inert gas prior to use herein.

The volatile constituents of the titanium or zirconium or nickel treated support are preferably driven off at this point as by calcining. Calcination of the treated support can be accomplished at nearly any temperature up to about its sintering temperature for a period of time at least sufficient to remove the adsorbed water but avoiding that which will remove all of the chemically bound water. Desirably, an air stream through the support during the calcination aids in obtaining a desirable product. Temperatures of from about 100°C. to 1000°C. for a short period of about two hours or so should be sufficient if a well dried gas such as air is used. The preferred temperature range is from 400°C. through 700°C.

Any grade of support can be used herein but the microspheroidal intermediate density (MSID) silica is preferred. This grade has a surface area of 258 square meters per gram and a pore diameter of about 288 A., although the intermediate density (ID) silica having the same area but a pore diameter of 164 A is just as satisfactory. Other grades such as the G-968 silica and G-966 silica-alumina, as designated by the W. R. Grace Co., having surface areas of 700 and 500 square meters per gram, respectively, and pore diameters of 50–70 A. are also quite satisfactory. Variations in molecular weight control and in polymer productivity can be expected between grades of supports.

The alkyl aluminum compounds that can be used are the trialkylaluminum compounds, the alkylaluminum halides, the alkylaluminum hydrides and the alkylaluminum alkoxides. In these compounds the alkyl group can contain from 1 to about 14 carbon atoms, and the halogen can be chlorine, bromine, fluorine or iodine. Illustrative thereof are trimethylaluminum, triethylaluminum, tributylaluminum, tridecylaluminum, tridodecylaluminum, diethylaluminum chloride, dibutylaluminum chloride, dibutylaluminum bromide, dibutylaluminum iodide, dibutylaluminum fluoride, dihexylaluminum chloride, methylaluminum dichloride, ethylaluminum dibromide, butylaluminum dichloride, pentylaluminum dichloride, diisobutylaluminum ethoxide and the like, as are well known in the art. They can be generically classed as compounds of the formula $R_aAlX_b$ wherein R is an alkyl group as defined above, X is hydrogen, halogen or alkoxy, $a$ is an integer from 1 to 3 inclusive and $b$ is an integer from 0 to 2 inclusive with the sum of $a$ and $b$ being 3.

The mole ratio of aluminum to chromium in the catalyst system can be varied from about 2 to 1 up to about 30 to 1 or more, with preferred ratios being from about 4 to 1 up to about 15 to 1. These ratios, however, are not critical as proportions outside these values may be used.

The concentration of the catalyst in the polymerization reaction can be varied from about 10 to about 25,000 parts per million based on the amount of olefin monomer charged but preferably the concentration is kept below about 500 parts per million.

The olefins that are polymerized with the catalyst system of this invention have from 2 to 8 carbon atoms and are 1-olefins and include ethylene, propylene, 1-butene, 1-pentane, 1-hexene, 4-methyl-1-pentene, 1-octene, butadiene, isoprene, piperylene, 1,3-octadiene, etc. Copolymers of two or more monomers can also be prepared according to this invention.

The homopolymers produced by the process of this invention are high density, highly crystalline products varying in molecular weight up to extremely high molecular weight which can be used in all of those well known applications in which polyolefins are employed, for example, in the production of films, fibers, pipes, gears, molded articles, extruded articles and the like, and these products can then be employed in the known conventional applications therefor. The copolymers are generally less crystalline and even amorphous solid high molecular weight polymers in some respects resembling rubbers and the like. As with other similarly prepared copolymers, they are significantly lower in density than the homopolymers.

The polymerization reaction is carried out at temperatures of from about 30°C. or less up to about 200°C. or more, depending to a great extent on the operating pressure, olefin monomer, the particular catalyst and its concentration. Naturally, the selected operating temperature is also dependent upon the desired polymer molecular weight since temperature is definitely a factor in adjusting the molecular weight of the polymer. Preferably the temperature is from about 30°C. to about 110°C. in the slurry of "particle forming" technique and from 100°C. to 200°C. in "solution forming". The control of temperature in this process is desirable as hereinafter more fully described in providing various effects upon molecular weight of the polymers as well as in controlling the phase in which they are made. As with most catalyst systems, the high temperatures produce the lower weight average molecular weight polymers and consequently are of high melt index.

Regardless of whether the "particle forming" low temperatures or "solution forming" high temperatures are employed, a unique faculty of this catalyst system is the ability to carry out the polymerization to very high polymers solids, substantially higher than obtainable with any other catalyst system without fouling of the equipment.

The pressure can be any pressure sufficient to initiate the polymerization of the monomer to high polymer and can be carried out from subatmospheric pressure, using an inert gas as diluent, to superatmospheric pressure up to about 1,000,000 psig or more, but the preferred pressure is from atmospheric up to about 1000 psig.

The inert organic solvent medium when employed in this invention is not narrowly critical but it should be inert to the catalyst and olefin polymer produced and stable at the reaction temperature used. It is not necessary, however, that the inert organic solvent medium serve also as a solvent for the catalyst composition or for the polymer produced. Among the inert organic solvents applicable for such purpose may be mentioned saturated aliphatic hydrocarbons such as hexane, heptane, pentane, isooctane, isobutane, purified kerosene and the like; saturated cycloaliphatic hydrocarbons such as cyclohexane, cyclopentane, dimethylcyclopentane and methyl-cyclohexane and the like; aromatic hydrocarbons such as benzene, toluene, xylene and the like; and chlorinated hydrocarbons such as chlorobenzene, tetrachloroethylene, orthodichlorobenzene and the like.

When it is desired to conduct the polymerization to a high solids level as hereinbefore set forth, it is of course desirable that the solvent be liquid at the reaction temperature. For example, operating at a temperature less than the solution temperature of the polymer in the solvent, the process can be essentially a slurry or suspension polymerization process in which the polymer actually precipitates out of the liquid reaction medium and in which the catalyst is dissolved or suspended as finely divided mass of itself or on an insoluble support as hereinbefore set forth.

The bis(triphenyltin) chromate is a new compound that has utility as indicated herein as a catalyst for polymerizing olefins particularly when used in combination with the alkyl aluminum compounds as defined herein. It can be made by the reaction of triphenyltin hydroxide with chromium trioxide or chromyl chloride.

All percentages herein are by weight.

The following are representative examples of practicing the invention.

EXAMPLE 1 (Control)

Davison Chemical Company 952 grade silica was dried at 550°C. Ethylene polymerization using a catalyst prepared by treating this silica with triisobutylaluminum and then 10 mg of bis(triphenyltin) chromate (Al/Cr = 10) gave polyethylene with a reactivity of 69,000 g/g Cr/hr.

Examples 2 – 4

Davison Chemical Company 952 grade silica was dried at 150°C. for an hour and it was then treated with tetraisopropyl titanate while fluidizing to give 2% titanium on the catalyst. It was activated at different temperatures. The resultant support was treated with triisobutylaluminum and subsequent reaction with bis(triphenyltin) chromate gave active ethylene polymerization catalysts.

| Example | Silica 2% Ti (g) | Act. Temp. °C. | Al/Cr Ratio | Reaction Temp. °C | Reactivity g/g Cr/hr |
|---|---|---|---|---|---|
| 2 | .71 | 330 | 10 | 86 | 82000 |
| 3 | .73 | 560 | 10 | 88 | 148000 |
| 4 | .64 | 780 | 10 | 86 | 114300 |

The optimum activation temperature was 560°C.

EXAMPLES 5 – 8

In these examples silica supports modified with different levels of titanium introduced as tetraisopropyl titanate and activated at 550°C. gave the following results in ethylene polymerization.

| Example | Silica Ti(%) | (g) Silica (Ti) | Al/Cr Ratio | Reaction Temp.°C | Reactivity g/g Cr/hr |
|---|---|---|---|---|---|
| 5 | 0.5 | .58 | 15 | 85 | 122800 |
| 6 | 1.0 | .58 | 15 | 86 | 152500 |
| 7 | 2.0 | .64 | 15 | 88 | 195300 |
| 8 | 3.0 | .51 | 15 | 90 | 157500 |

EXAMPLES 9 – 10

In the following examples zirconium tetrachloride and nickel chloride treated Davison 952 silica was used after activation. The aluminum compound used was again triisobutylaluminum.

| Example | Type of Silica | Support (g) | Al/Cr Ratio | Reaction Temp. °C | Reactivity g/g Cr/hr |
|---|---|---|---|---|---|
| 9 | 952–1%Zr (550°C) | .71 | 15 | 83 | 112300 |
| 10 | 952–2%Ni (550°C) | .81 | 15 | 84 | 97000 |

EXAMPLE 11

A solution deposition technique was also used for treating silica with tetraisopropyl titanate. In a three-necked 250 ml flask was placed 25 g of Davison Chemical 952 grade silica and 150 ml of hexane. To this mixture was added 3 ml of tetraisopropyl titanate calculated to give 2% Ti on silica. The reaction was allowed to proceed for two hours. The excess hexane was distilled off. The dry silica containing titanium was heated to 100°C. and held at that temperature for 0.5 hour in a flow of argon. The treated silica was transferred to a storage flask under argon. About 8 g of the titanated silica prepared as described above was placed in a quartz activator and it was heated to 550°C. in a flow or air. The air was replaced with nitrogen and the silica containing 2% Ti was transferred to a storage flask. This silica was used as a support in ethylene polymerization along with bis(triphenyltin)chromate and triisobutylaluminum to give the following results.

| Example | Silica 2% Ti (g) | Al/Cr Ratio | Temp. (°C) | Reactivity g/g Cr/hr |
|---|---|---|---|---|
| 12 | .61 | 15 | 91 | 1265000 |

Having described our invention as related to the embodiments set out herein, it is our intention that the invention be not limited by any of the details of description, unless otherwise specified, but rather be construed broadly within its spirit and scope as set out in the appended claims.

We claim:

1. The method of making polymers from polymerizable 1-olefins which comprises polymerizing at least one of said olefins under polymerizing conditions with a catalyst system consisting essentially of the reaction product prepared by reacting together at an elevated temperature (1) a support which is a finely divided insoluble inorganic support material of the class consisting of silica, alumina, zirconia and mixtures thereof modified by reacting said support with a compound of the class consisting of alkyl esters containing 1 to about 7 carbon atoms in the alkyl group and halides of titanium, zirconium, nickel and mixtures thereof in amounts to give about 0.5–10% metal on the support (2) an organotin chromate essentially of the formula

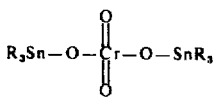

and (3) a cocatalytic amount of an alkyl aluminum compound of the formula $R_aAlX_b$ in each of which formula each R is an individually selected hydrocarbon radical containing from 1 to about 14 carbon atoms, X is a member of the class consisting of halogen, hydrogen and alkoxy, $a$ is an integer from 1 to 3 inclusive and $b$ is an integer from 0 to 2 inclusive, with the sum of $a$ and $b$ being 3, the said system having an aluminum-chromium ratio of at least 2 to 1.

2. The method of claim 1 wherein said compound of the class consisting of said esters and halides is reacted with the support by fluidizing the finely divided support in the form of a bed with a substantially dry gas while adding to the bed at an elevated temperature while fluidizing said compound of the class consisting of said esters and halides, followed by driving off the volatile constituents from the bed.

3. The method of claim 2 wherein said driving off of the volatile constituents is achieved by calcining the bed mixture at an elevated temperature.

4. The method of claim 1 wherein said chromate is a bis-triphenyltinchromate essentially of the formula

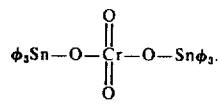

5. The method of claim 1 wherein said system has an aluminum-chromium ratio of 2 to 30:1.

6. The method of claim 5 wherein said system has an aluminum-chromium ratio of 4 to 15:1.

7. The method of claim 1 wherein said chromate is bis(trimethyltin)chromate.

8. The method of claim 1 wherein said chromate is bis(triethyltin)chromate.

9. The method of claim 1 wherein said olefin is ethylene.

10. The method of claim 1 wherein said polymerizing is at a temperature of about 30°–200°C. and at a polymerizing pressure.

11. The method of claim 1 wherein said alkyl esters and halides are substantially free of non-aqueous solvents.

12. The method of claim 1 wherein said support is substantially dry and the modified support of (1) is substantially freed of volatile constituents before reacting with said organotin chromate and said alkyl aluminum compound.

* * * * *